United States Patent [19]

Suzuki

[11] Patent Number: 5,235,146
[45] Date of Patent: Aug. 10, 1993

[54] STEERING WHEEL HORN SWITCH ARRANGEMENT

[75] Inventor: Michitaka Suzuki, Shizuoka, Japan

[73] Assignee: Nihon Plast Co., Ltd., Fuji, Japan

[21] Appl. No.: 875,325

[22] Filed: Apr. 29, 1992

[30] Foreign Application Priority Data

May 29, 1991 [JP] Japan .................... 3-125774

[51] Int. Cl.$^5$ .................... H01H 9/00; B60R 21/16
[52] U.S. Cl. .................... 200/61.54; 200/61.55; 280/731
[58] Field of Search ............ 200/61.54, 61.55, 61.56, 200/61.57; 280/728–735

[56] References Cited

U.S. PATENT DOCUMENTS

| 4,785,144 | 11/1988 | Fosnaugh et al. | 200/61.55 |
| 4,808,776 | 2/1989 | Niwa et al. | 200/61.55 |
| 4,963,704 | 10/1990 | Buma et al. | 200/61.55 |
| 5,023,412 | 6/1991 | Ishida | 200/61.54 |
| 5,056,814 | 10/1991 | Shiraki et al. | 280/731 |

FOREIGN PATENT DOCUMENTS

| 0330306 | 8/1989 | European Pat. Off. . |
| 63-181216 | 7/1988 | Japan . |
| 3-79471 | 4/1991 | Japan . |

Primary Examiner—J. R. Scott
Attorney, Agent, or Firm—Foley & Lardner

[57] ABSTRACT

A horn switch arrangement for a vehicle steering wheel comprises a steering wheel affixed to a steering shaft of a vehicle, a horn plate movably mounted on the steering wheel with a spring urging the horn plate away from the steering wheel. The horn plate is provided with insulating members above and below for resiliently and mounting the horn plate in an insulated condition. A base plate is mounted on the upper insulating member the base plate being normally covered with a pad. The base plate may be further utilized to conveniently mount an airbag module on the steering wheel.

15 Claims, 3 Drawing Sheets

STEERING WHEEL HORN SWITCH ARRANGEMENT

BACKGROUND OF THE INVENTION

1. Field of the Invention

The present invention relates generally to a horn switch arrangement for a steering wheel of an automotive vehicle.

2. Description of the Prior Art

Conventionally, vehicle steering wheels are provided with a horn switch for activating a vehicle horn. For example, one such steering wheel arrangement is proposed in Japanese Patent Application First Publication (unexamined) 63-181216. According to this disclosure, a fixed portion is arranged in connection with a movable horn plate. a spring is arranged between the fixed portion and the horn plate in order to maintain a predetermined space therebetween. A pad is arranged over the horn plate. When the pad is pushed by a vehicle driver, the horn plate is moved closer to the fixed portion activating a horn switch for causing the vehicle horn to sound.

Projecting from an interior wall portion of the pad, a leg portion is provided for connecting to the horn plate as well as a plurality of rib portions for maintaining a height of the pad relative the horn plate.

However, in such steering wheel arrangements, in a case where an airbag module is to be inserted in a portion of a steering wheel, sufficient space for such an airbag module is not easily available.

To overcome this problem, another such conventional steering wheel arrangement is proposed in Japanese Patent Application First Publication 3-79471, which includes a horn plate, with a movable portion connected to a fixed portion of a steering wheel, spring means for maintaining a gap between the movable and fixed portions, and means for maintaining a height of a pad affixed to the horn plate.

As a result, a portion of a steering wheel assembly used for housing an airbag module becomes large and a number of parts for such assembly is increased, as well as the time necessary for installation and the difficulty of such installation.

SUMMARY OF THE INVENTION

It is therefore a principal object of the present invention to overcome the drawbacks of the prior art.

It is a further object of the invention to provide a simplified steering wheel horn switch assembly which is reliably operable and allows sufficient space for provision of such as an air bag module, for example.

In order to accomplish the aforementioned and other objects, a horn switch arrangement for a vehicle steering wheel is provided, the steering wheel including a fixed portion and a movable portion separate from the fixed portion, the movable portion including: a horn plate movably installed on the steering wheel; first insulating means provided on an upper surface of the horn plate, the first insulating means further including a projecting portion projecting downward, through an opening provided in the horn plate to project from a lower surface of the horn plate; second insulating means provided on a lower surface of the horn plate, the second insulating means interposed between the horn plate and the fixed portion of the steering wheel and, the second insulating means including an opening through which the projecting portion of the first insulating means, projecting from the lower surface of the horn plate, further extends; spring means urging the movable portion away from the fixed portion of the steering wheel, the spring means interposed between the fixed portion of the steering wheel and the second insulating means and engaging part of the projecting portion of the first insulating means; first contact means, means provided on the horn plate; mounting means provided on the first insulating means, the mounting means mounting a pressure receiving member thereon; and the fixed portion of the steering wheel including second contact means provided in alignment with the first contact means provided on the horn plate.

DESCRIPTION OF THE PREFERRED EMBODIMENT

Figure 2:
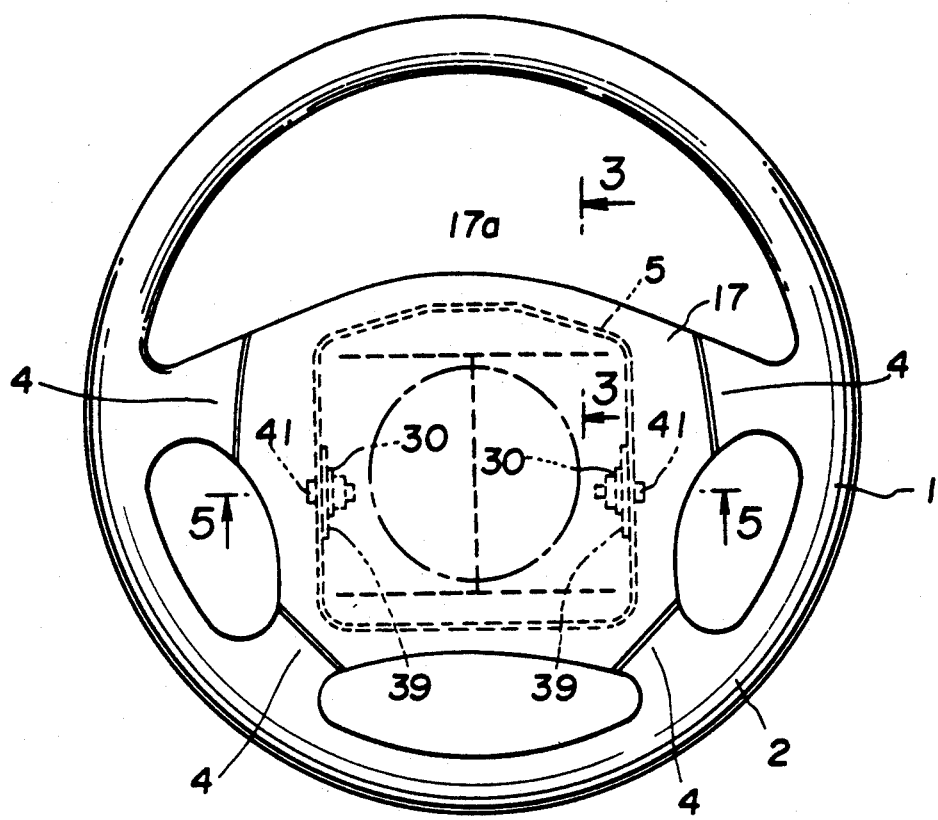
FIG. 2 is a schematic view of the horn switch arrangement of FIG. 1 installed on an automotive steering wheel.
Figure 5:
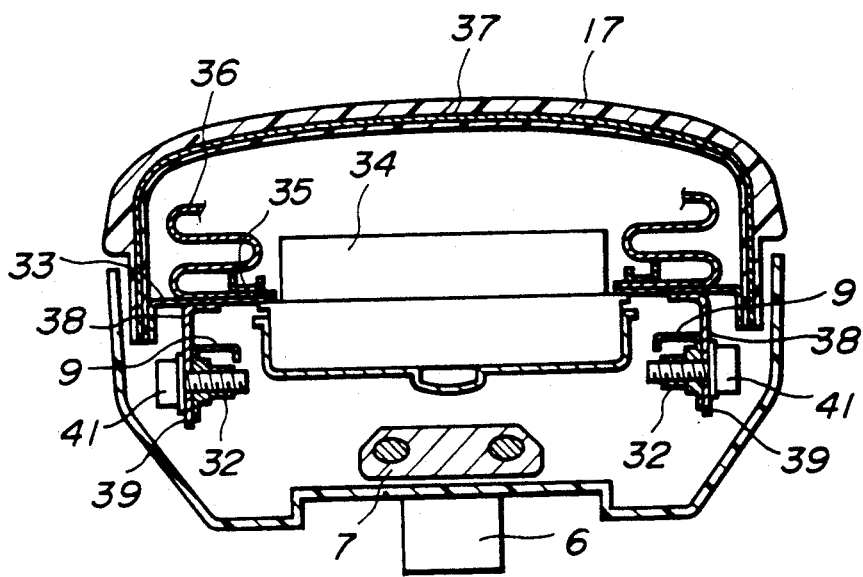
FIG. 5 is a cross-sectional view taken along line 5—5 of FIG. 2.

Referring now to the drawings, FIG. 2 shows a schematic view of the horn switch arrangement of the invention as installed on an automotive steering wheel. the steering wheel 1 comprises a circular rim 2, a boss 3, and a plurality of spokes 4. An airbag module 5 is mounted above the boss 3. As seen in FIG. 5, the steering wheel is mounted to a steering shaft (not shown) of an automotive vehicle via a tubular boss 6, made of metal, for example. The tubular boss 6 is fixed to a base portion of the steering wheel via an anchor portion 7.

Now, referring to FIG. 1, a horn switch assembly 8 according to the invention will be described hereinbelow. It will be noted that, according to the present embodiment, left and right horn switch assemblies are provided on each side of the steering wheel 1 respectively. The horn switch assembly 8 comprises a horn plate 9 made of sheet metal or the like. The horn plate is approximately T-shaped with a plane of the upper cross portion 9a of the T being perpendicular to a stem portion 30 thereof. In the present embodiment the arrangements described hereinbelow are provided in substantially symmetrical fashion on each side of the cross portion 9a of the horn plate 9. Screws 10 are provided through holes 11 provided in upper surfaces on each side of the horn plate 9 for adjusting a height of the horn switch assembly relative to the anchor portion 7. The height adjustment is effected by coil springs 23 through which the screws 10 pass before engaging threaded openings 25 provided in the anchor portion 7. Proximate the holes 11, in the cross portion 9a of the horn plate 9, regulating holes 12 are provided. On a lower surface of the cross portion 9a between the through hole 11 and the regulating hole 12 a movable contact portion 14 is provided. The movable contact portion is aligned with a fixed contact portion 13 provided on the anchor portion 7.

Figure 4:
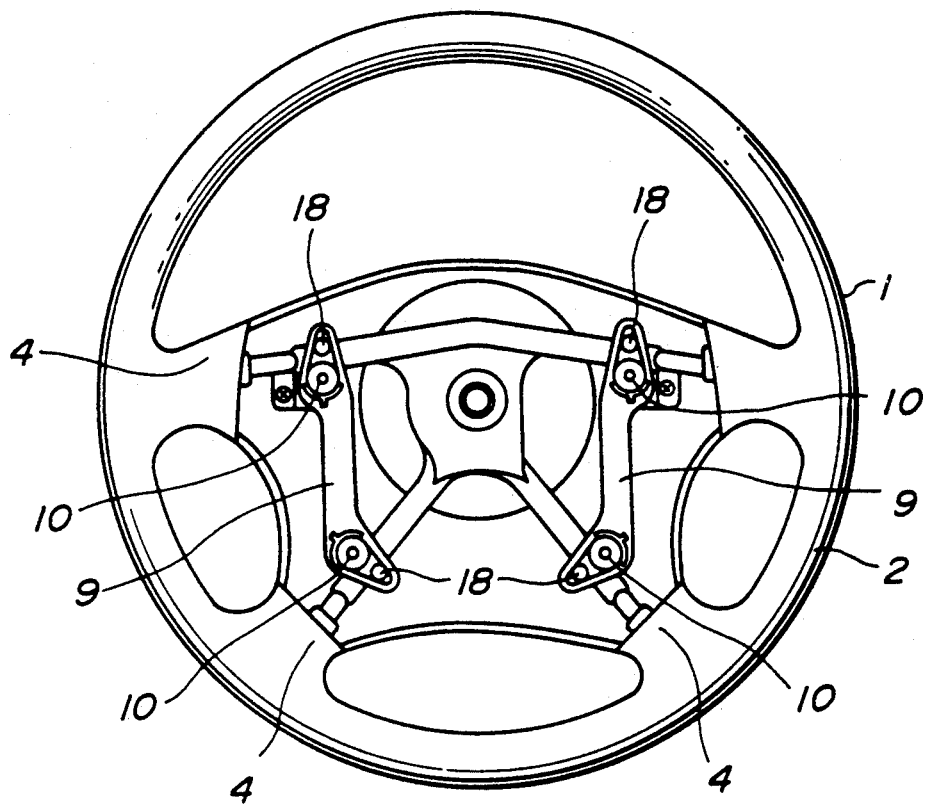
FIG. 4 is a cut away view of a structure of a steering wheel pad according to the invention.

On the upper surface of the cross portion 9a of the horn plate 9, first insulating members 15 are respectively provided. The first insulating member 15 comprises a base portion 16 and, projecting from a lower surface of the base portion 16 are lower projecting portions 20 which fit through the through hole 11 to project to a lower side of the cross portion 9a of the horn plate. The base portion 16 is also provided with a through hole 24 through which the screw 10 passes. The base portion 16 is also provided with a pad mounting projection 18 (see FIG. 4) on which a pad 17 is positioned and, projecting from a lower distal end surface of the first insulating members 15, projections 16a are provided for engaging the regulating holes 12, respectively.

Further, provided at a lower surface of the cross portion 9a of the horn plate 9, second insulating members 21 are provided. The second insulating member 21 has a circumferential opening 22 which accepts the lower projecting portion 20 of the first insulating member 15. Also, on an upper surface of the second insulating member 21, an upwardly projecting portion 21a is provided which engages a second regulating hole 12a provided in the cross portion 9a of the horn plate 9. The first and second insulating members may be formed of synthetic resin material, for example.

As described above, the screw 10, the through hole 24 of the first insulating member 15, the through hole 11 of the cross portion 9a, the circumferential opening 22 of the second insulating member 21, and the coil spring 23 are coaxially arranged by engagement of a threaded portion 26 of the screw 10 with the threaded opening 25 of the anchor portion 7. The spring force of the coil spring 23 serves to maintain a space between the fixed contact portion 13 and the movable contact portion 14. The coil spring 23 engages a terminal engaging portion 19 of the lower projecting portion 20 of the first insulating member 15, which projects through the through hole 11 of the cross portion 9a, at one end thereof, and contacts an upper surface of the anchor portion 7 at another end thereof.

According to the above arrangement, the horn plate 9 is resiliently movable in upper and lower directions according to pressure applied thereto, with a rest position thereof being determined by the springs 23. Further, when urged in a downward direction, the fixed contact portion 13 is brought into contact with the movable contact portion 14, for activating the vehicle horn.

Figure 1:
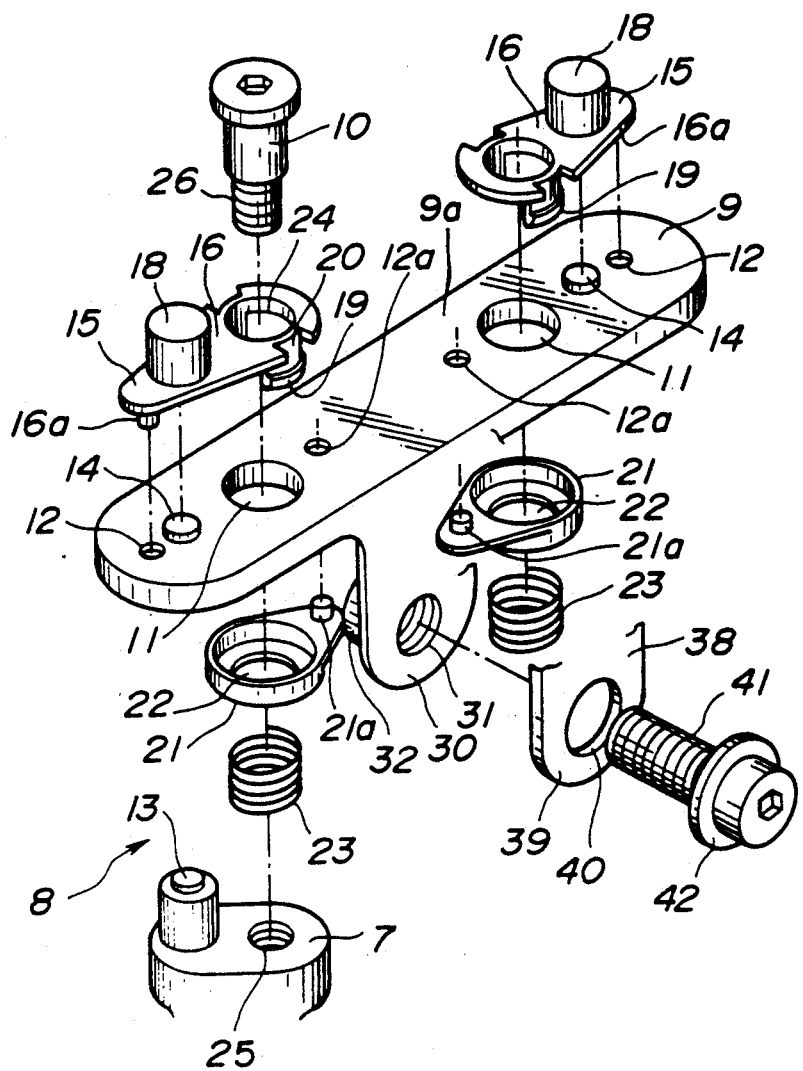
FIG. 1 is an exploded perspective view of a horn switch arrangement according to the invention.

As seen in FIG. 1, a stem portion 30 extends downward relative to the cross portion 9a of the horn plate 9. The stem portion is provided with a through hole 31 associated with a nut 32 affixed to one side of the stem portion 30. The above-described assembly is used for mounting the horn switch assembly on the steering wheel 1 as will be described more fully herein later.

Figure 3:
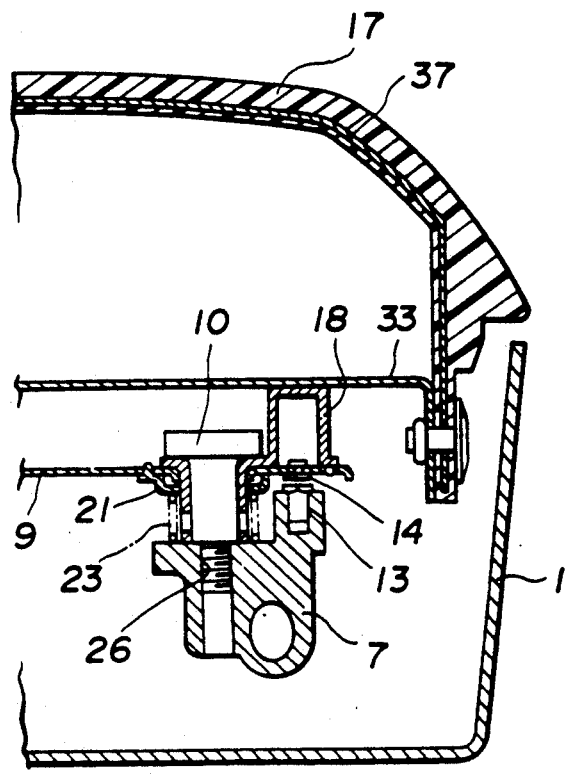
FIG. 3 is a cross-sectional view taken along line 3—3 of FIG. 2.

Now, referring to FIG. 5, an airbag module 5 is supported on a base plate 33, the base plate 33 may be formed of pressed steel or aluminum for example. A gas cartridge 34 is mounted on the base plate 33 for inflating a gas bag 36 portion of the airbag module in response to vehicle impact. The gas cartridge 34, the gas bag 36 are surrounded circumferentially and covered by a cover portion 37 which is of a net material of metal, for example, which is embedded in the pad 17. As seen in FIG. 3 the cover portion 37 may be held to the base plate 33 by rivets or the like.

Thus, under a vehicle impact condition, the gas cartridge 34 is activated for releasing gas, thus inflating the gas bag 36. When the gas bag 36 is inflated to sufficient pressure, the cover portion 37 and pad portion 17 are opened from the steering wheel along tear lines 17a (see FIG. 2) thus freeing the gas bag to inflate fully for preventing the vehicle driver from collision with internal structural components of the vehicle during collision impact.

Further, as seen in FIGS. 1 and 5, the base plate 33 is mounted via L-shaped brackets 38 at left and right sides thereof. The bracket 38 has a retaining hole 40 defined in a lower end 39 thereof for aligning with the through hole 31 associated with the nut 32 affixed to one side of the stem portion 30, for being retained thereto by a retaining bolt 41.

Thus the entire airbag module is movable in up and down directions so that the horn may be freely operated without inhibiting the functioning or mounting of a vehicle airbag.

Further, since the bolt 41 mounting the base plate 33 to the steering wheel 1 via the horn plate 9 is provided below the base plate 33, no portions for protecting the gas bag 36 from puncture by mounting components of the airbag module 5 are required.

In addition, although in the above-described embodiment, the horn plate 9 is attached to an anchor portion 7 of the steering wheel 1, the horn plate may alternatively be connected to another part of the steering wheel, such as a mounting plate.

Also, though the present embodiment is described in terms of a steering wheel mounting an airbag module, the horn switch of the present invention is also applicable to steering arrangement not utilizing an airbag.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A horn switch arrangement for a vehicle steering wheel including a fixed portion and a movable portion separate from said fixed portion, said movable portion including:

a horn plate movably installed on said steering wheel;

first insulating means provided on an upper surface of said horn plate, said first insulating means further including a projecting portion projecting downward, through an opening provided in said horn plate to project from a lower surface of said horn plate;

second insulating means provided on a lower surface of said horn plate, said second insulating means interposed between said horn plate and said fixed portion of said steering wheel and, said second insulating means including an opening through which said projecting portion of said first insulating means, projecting from said lower surface of said horn plate, further extends;

spring means urging said movable portion away from said fixed portion of said steering wheel, said spring means interposed between said fixed portion of said steering wheel and said second insulating means and engaging part of said projecting portion of said first insulating means;

first contact means, provided on said horn plate;

mounting means provided on said first insulating means, said mounting means mounting a pressure receiving means thereon; and said fixed portion of said steering wheel including second contact means provided in alignment with said first contact means provided on said horn plate.

2. A horn switch arrangement as set forth in claim 1, wherein a pair of said first and second insulating means, said spring means, said first contact means and said mounting means are provided on a single horn plate.

3. A horn switch arrangement as set forth in claim 1, wherein said pressure receiving member is mounted on a pair of said horn switch arrangements.

4. A horn switch arrangement as set forth in claim 1, wherein an airbag module is mounted on said mounting means under said pressure receiving means.

5. A horn switch arrangement as set forth in claim 1, wherein said first insulating means includes upwardly extending projections for supporting said mounting means.

6. A horn switch arrangement as set forth in claim 4, wherein a cover portion is provided over said mounting means, said pressure receiving means being provided over said cover portion.

7. A horn switch arrangement as set forth in claim 1, wherein said spring means is a coil spring.

8. A horn switch arrangement as set forth in claim 7, wherein said spring means, said opening through said horn plate, and through openings defined in each of said first and second insulating means are coaxially aligned by fastening means engaged with said fixed portion of said steering wheel, said fastening means determining a maximum separation between said fixed portion and said movable portion of said steering wheel.

9. A horn switch arrangement as set forth in claim 1, wherein said pressure receiving means comprises a substantially circular pad provided in a center area of said steering wheel.

10. A horn switch arrangement as set forth in claim 1, wherein said horn plate is substantially T-shaped, including a cross portion and a stem portion, a plane of said cross portion being perpendicular to a plane of said stem portion and said opening being provided in said cross portion.

11. A horn switch arrangement as set forth in claim 10, wherein said horn plate is mounted to said mounting means via said stem portion thereof, a plane of an attachment between said stem portion and a bracket connected to said mounting means being below a plane of said mounting means.

12. A horn switch arrangement as set forth in claim 1, wherein said mounting means comprises a mounting plate, an area of which occupying a substantially center area of said steering wheel.

13. A horn switch arrangement as set forth in claim 1, wherein said first and second insulating means include projections, respectively oriented toward said upper and lower surfaces of said horn plate, said horn plate further including openings for receiving said projections.

14. A horn switch arrangement as set forth in claim 6, wherein said airbag module includes a base plate, a gas cartridge, and a gas bag, said cover being openable along predetermined tear lines according to increasing pressure in said gas bag.

15. A horn switch arrangement as set forth in claim 6, wherein said cover portion is of a net-like structure of a reinforcing material which is embedded in said pressure receiving means.

* * * * *